(No Model.) 3 Sheets—Sheet 3.
F. R. MERRELL & O. M. THOMAS.
CARRIAGE TOP.
No. 415,875. Patented Nov. 26, 1889.
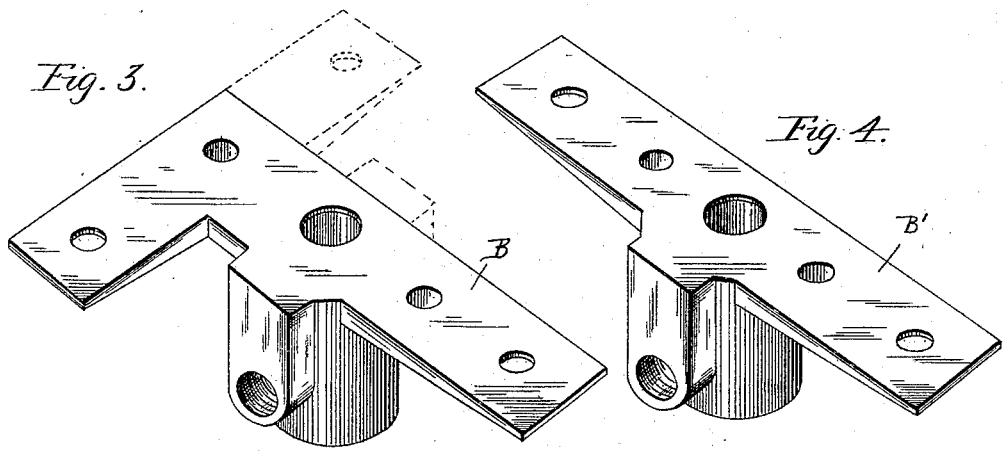
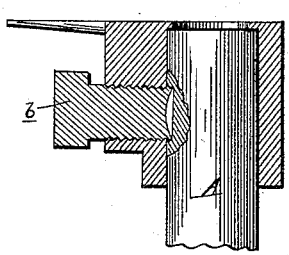
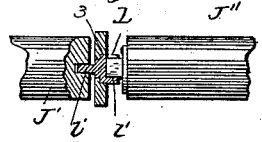
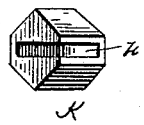
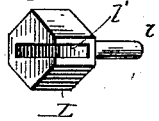
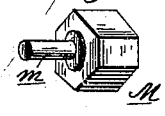
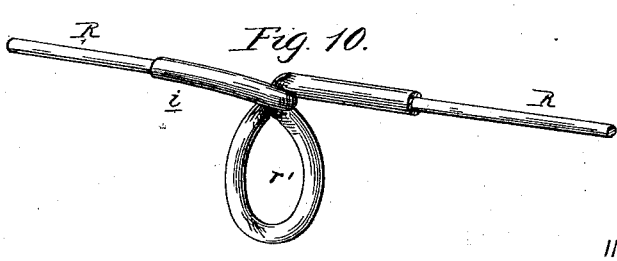
WITNESSES:
Wm. T. Robertson
Thos. E. Robertson
INVENTORS:
Fredus R Merrell
Oscar M Thomas
By T. J. W. Robertson
ATTORNEY

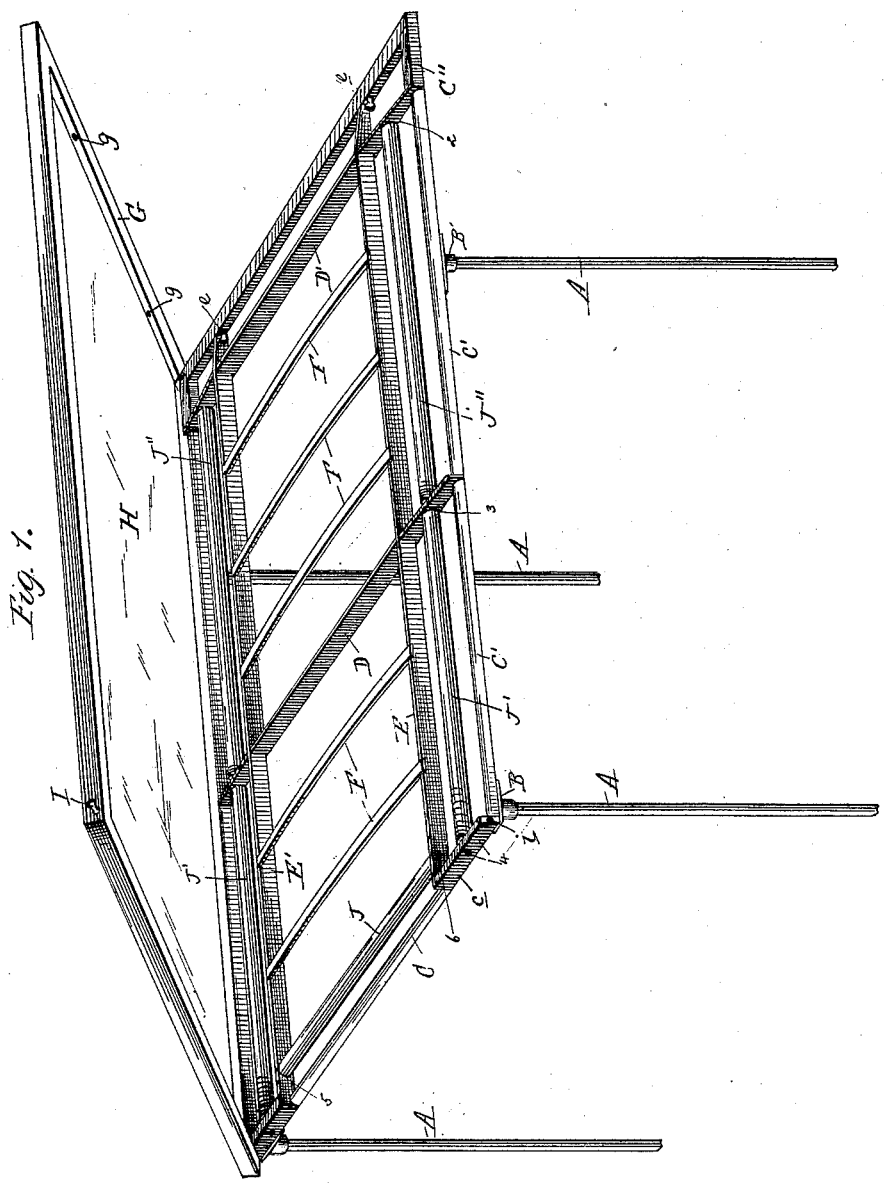

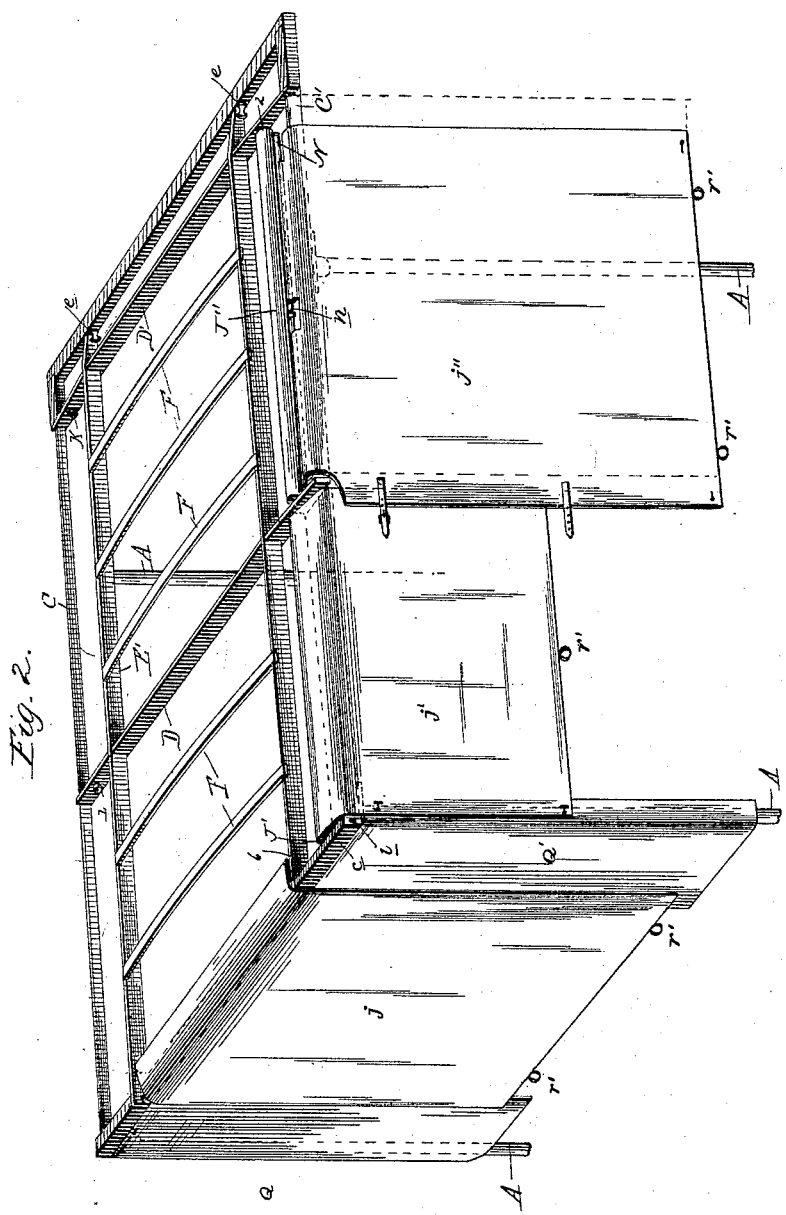

UNITED STATES PATENT OFFICE.

FREDUS R. MERRELL AND OSCAR M. THOMAS, OF VERSAILLES, OHIO.

CARRIAGE-TOP.

SPECIFICATION forming part of Letters Patent No. 415,875, dated November 26, 1889.

Application filed April 5, 1889. Serial No. 306,147. (No model.)

*To all whom it may concern:*

Be it known that we, FREDUS R. MERRELL and OSCAR M. THOMAS, citizens of the United States, residing at Versailles, in the county of Darke and State of Ohio, have invented certain new and useful Improvements in Carriage-Tops, of which the following is a specification, reference being had therein to the accompanying drawings.

This improvement relates to that class of canopy-tops for carriages and buggies that are provided with spring-rollers; and the invention consists in the peculiar construction, arrangement, and combination of parts hereinafter more particularly described, and then definitely pointed out in the claims.

Figure 1 represents a perspective view of a carriage-top constructed according to our improvement with the valance and deck raised to show the rollers, &c. Fig. 2 is a similar view with the deck removed and with some of the curtains in position. Figs. 3, 4, and 5 are details, on a larger scale, of the irons connecting the posts with the frame of the canopy. Fig. 6 is a detail showing the connection of the rollers. Figs. 7, 8, and 9 are perspective views of the irons which receive the pivots of the rollers. Fig. 10 is a perspective view of a rubber-covered ring forming a handle and stop for the curtain.

Referring now to the details of the drawings, A A A A indicate the posts, intended to be attached to a carriage in the usual or any convenient manner.

B B' are two of the irons fitting on the posts, which are bored out or cast the size of the posts except at the top, where the hole is a little smaller, forming a bearing for the top ends of the posts, which are fastened therein with a steel set-screw $b$, having a cupped end, (see Fig. 5,) which thus cuts its way into the post and holds the same firmly. There are two other irons, one of which (not shown) is like that marked B', Fig. 4, and the other is like that marked B, Fig. 3, except that the angular part and the part receiving the set-screw are reversed, as shown in dotted lines in said Fig. 3. Resting on these irons, and secured thereto in any convenient way, but preferably by bolts or screws, are three rails—viz., the back rail C and the side rails C' C'—and to the front ends of these rails C C is attached the front rail C''. Attached to said rails C' C' are two cross-pieces D D', which receive the inner rails E E', and which are also secured at their ends to the rails C and C''. These rails carry the ribs F F, which are secured thereto in any convenient manner. The rails C' C' are rounded off at the outer top edge to allow the curtains to pass smoothly over them, and the rail C is similarly rounded off for part of its length, leaving the ends of full size.

In the front ends of the rails E are set pins $e\ e$, which project slightly over the rail C and enter holes $g\ g$ in the valance G, which carries the deck H. Near the rear of the sides of the valance are shown spring-pins I I, which are inserted through the valance and pass into holes $i$ in the ends of the rail C, by which means the valance and deck can be firmly secured in place or readily raised to manipulate or remove or replace the curtains, should it be desired to do so. The spring-pins are similar to the common spring sash-fastening, and require no further description here.

The curtains are supported on spring-rollers J, J', and J'', there being one roller J at the back carrying the curtain $j$, two (marked J') carrying the rear side curtains $j'$, and two (marked J'') carrying the front curtains $j''$. The spring end of roller J'' is hung in a slot $k$ in a holder K, (see Fig. 7,) which is driven into a hole 2 in the cross-bar D'. The other end of the roller has a hole which receives a pin $l$ of the holder L, (see Fig. 8,) which is set in a hole 3 in the cross-bar D in such a manner that a slot $l'$ in said holder receives the spring end of the roller J', and whose other end has a hole that receives the pin $m$ of the holder M, (see Fig. 9,) which holder is driven into a hole 4 in the large part $c$ of the rail C. It will be seen from this description that but three holders are required to hold two curtains, as the center one L (see Fig. 8) holds the ends of two rollers. The arrangement of the heads and rollers just described is that of the right-hand side of the top, or that nearest to the spectator in the drawings. The rollers on the other side are arranged in substantially the same way, only the holders Figs. 7 and 9 should change places and the holder Fig. 8 should be turned in the opposite direction. One end of the back roller J is held in a slotted holder like Fig. 7 set into the inside rail E at 5, and a holder like Fig. 9 is set into the rail E' at 6, with the pin projecting to enter a socket in the other end of said roller. The back curtain j and the two rear side curtains j' j' are attached to their rollers by making a wide hem in the tops of the curtains just large enough to receive the rollers which are slipped in said hems, and the latter fastened by tacks at the ends. The front curtain j'' is attached to a wire N, having its ends bent at right angles and secured to the ends of the roller, and the wire is further supported by a staple at n. The curtain j'' is loosely attached to this wire, so as to slide thereon, and is cut out at the upper corners and the middle of the top to allow of its being moved on the wire, so that it may assume the position shown in full lines in Fig. 1 to lap over curtains j', or as shown in dotted lines in the same figure to allow of its being rolled up. At the rear corners of the top are the usual "quarters" Q Q'; but as nothing is claimed for them it is unnecessary to describe them further. At the bottom of each curtain is a wire R, (see Fig. 10,) covered with rubber i and twisted to form a ring or rings r' at right angles to the length of the wire. This wire is sewed into the bottom of the lower hem of the curtain, and serves as a handle to pull it down and as a stop to prevent its going up too far between the deck and the head-lining of the canopy.

From the above it will be seen that we have provided a very convenient arrangement of the curtains, which admits of their easy and ready adjustment, and one in which the curtains are rolled up out of the way and protected from wear when not in use.

What we claim as new is—

1. A canopy-top provided with a removable valance having a deck attached thereto, substantially as described.

2. The combination of the canopy-frame, the removable valance, the pins e, entering the valance, and spring-pins set in the valance and entering the rail, substantially as described.

3. In a canopy-top, and in combination with the curtains set below the deck, the back and side rails of said canopy having their upper outer edges rounded off, substantially as described.

4. In combination with a canopy-frame and the rails and valance thereof, curtains running between said valance and rails, substantially as described.

5. The combination, in a canopy-top, of the ribs and the inner and outer rails arranged to leave a space between said rails to receive the curtain-rollers, and the inside rails arranged to support the ribs, substantially as described.

6. The combination, in a canopy-top, of the outside side and rear rails, the cross-pieces resting on the side rails, and the holders for the rollers supported in said cross-pieces and rear rail, substantially as described.

7. An iron for fastening a canopy-frame to a post, having a hole to receive the post, a rim at the top to rest on the top of the post, and a cupped steel set-screw bearing on the post, substantially as described.

8. The combination, in a canopy-frame and with the rollers thereof, of the holder K, having a slot k, the holder L, having slot and pin, and the holder M, having a pin, substantially as described.

9. The combination, with a carriage-top, of two rolling curtains arranged side by side, one of which moves endwise at the top to lap over the other, substantially as described.

10. In combination with a carriage-curtain, a ring attached to said curtain and set at right angles to the curtain to form a handle and a stop, substantially as described.

11. The combination, with a curtain-roller, of a wire attached to said rollers near its ends and a curtain moving endwise on said wire, substantially as described.

12. The combination, with a curtain-roller and a wire attached to said roller near its ends and supported near its center, of a curtain sliding endwise on said wire and cut out at the center and end, substantially as described.

In testimony whereof we affix our signatures, in presence of two witnesses, this 3d day of April, 1889.

FREDUS R. MERRELL.
    OSCAR M. THOMAS.

Witnesses:
 SAMUEL S. JACKSON,
 JAMES C. AUNTELLE.